March 23, 1948. F. WALLER ET AL 2,438,137
APPARATUS FOR PROJECTING MOTION PICTURES
Filed Dec. 21, 1943 6 Sheets-Sheet 2
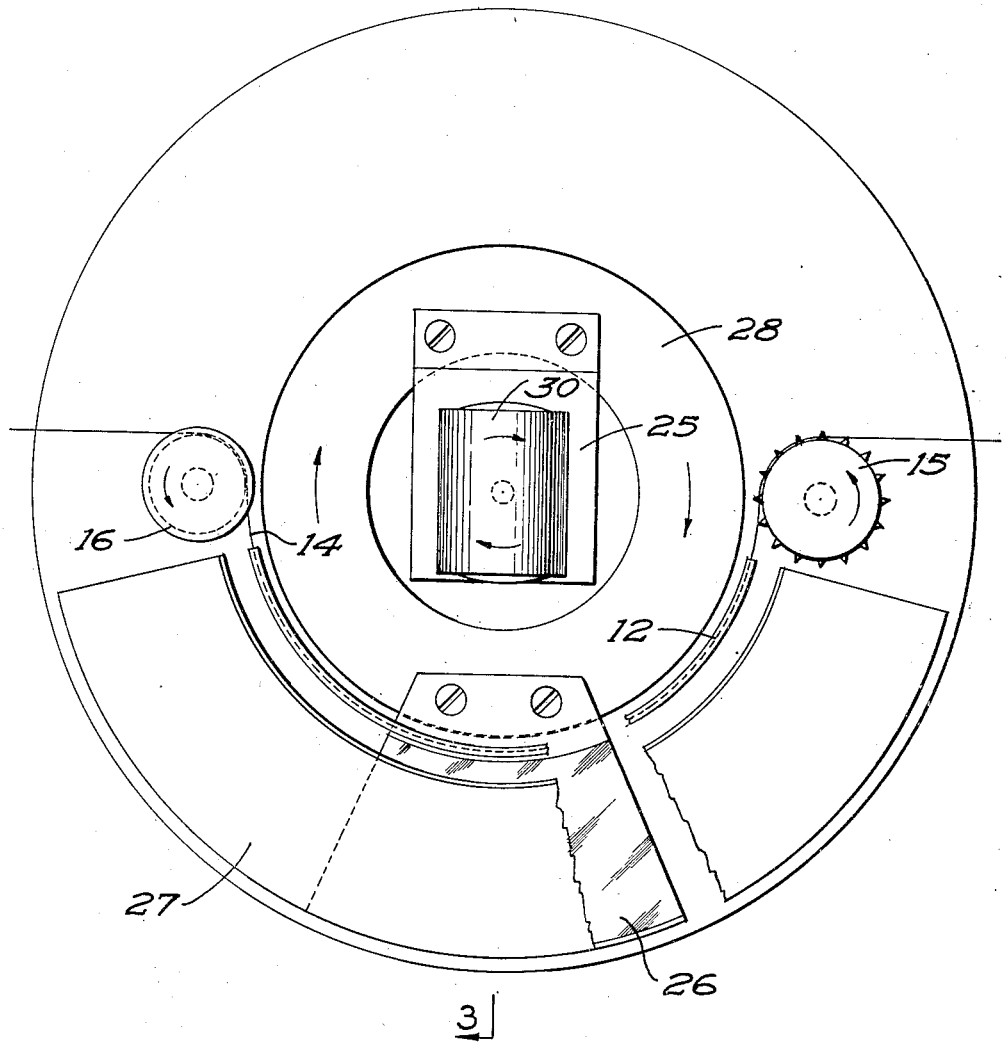

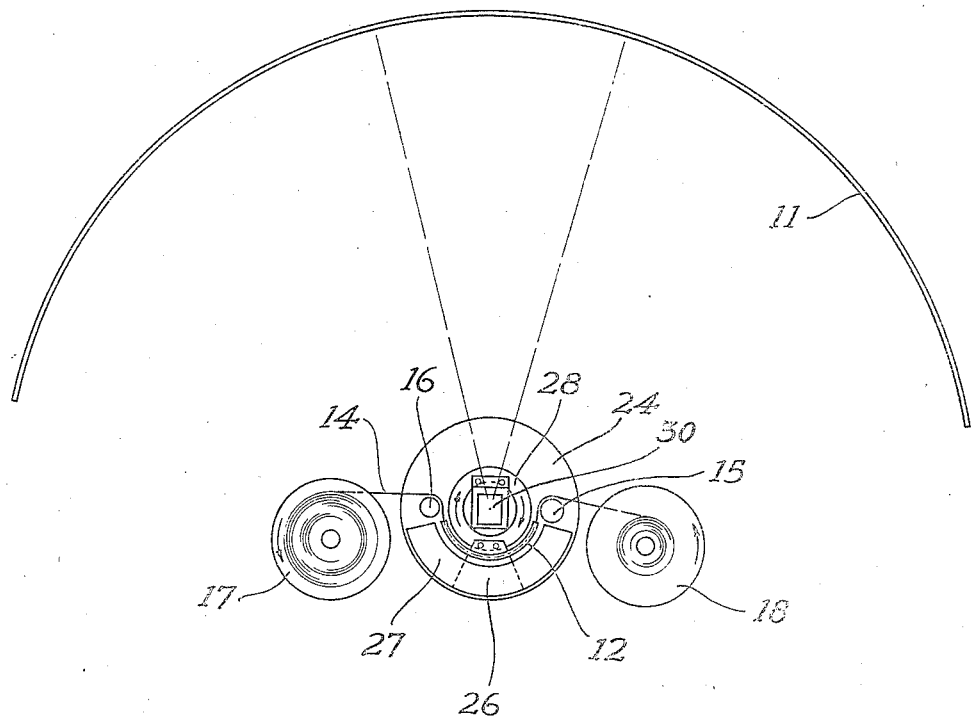

March 23, 1948.    F. WALLER ET AL    2,438,137
APPARATUS FOR PROJECTING MOTION PICTURES
Filed Dec. 21, 1943    6 Sheets-Sheet 3
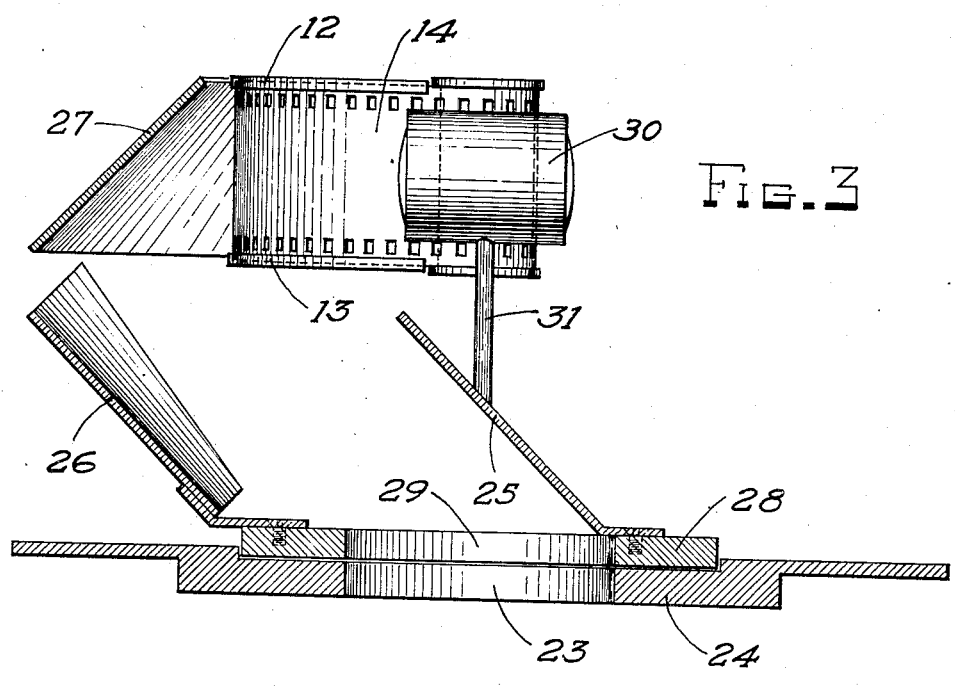
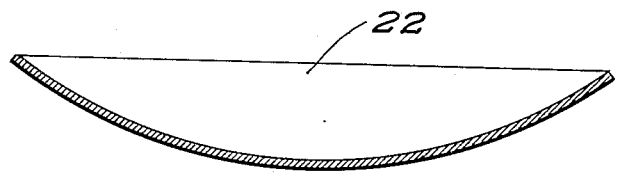

March 23, 1948. F. WALLER ET AL 2,438,137
APPARATUS FOR PROJECTING MOTION PICTURES
Filed Dec. 21, 1943 6 Sheets-Sheet 4
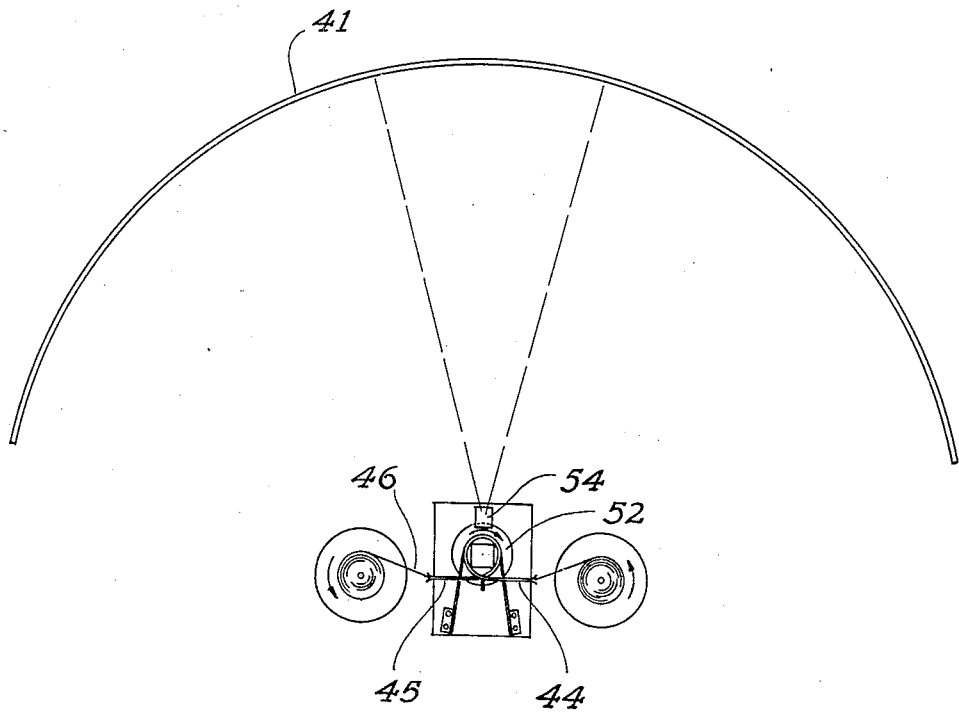

March 23, 1948. F. WALLER ET AL 2,438,137
APPARATUS FOR PROJECTING MOTION PICTURES
Filed Dec. 21, 1943 6 Sheets-Sheet 6
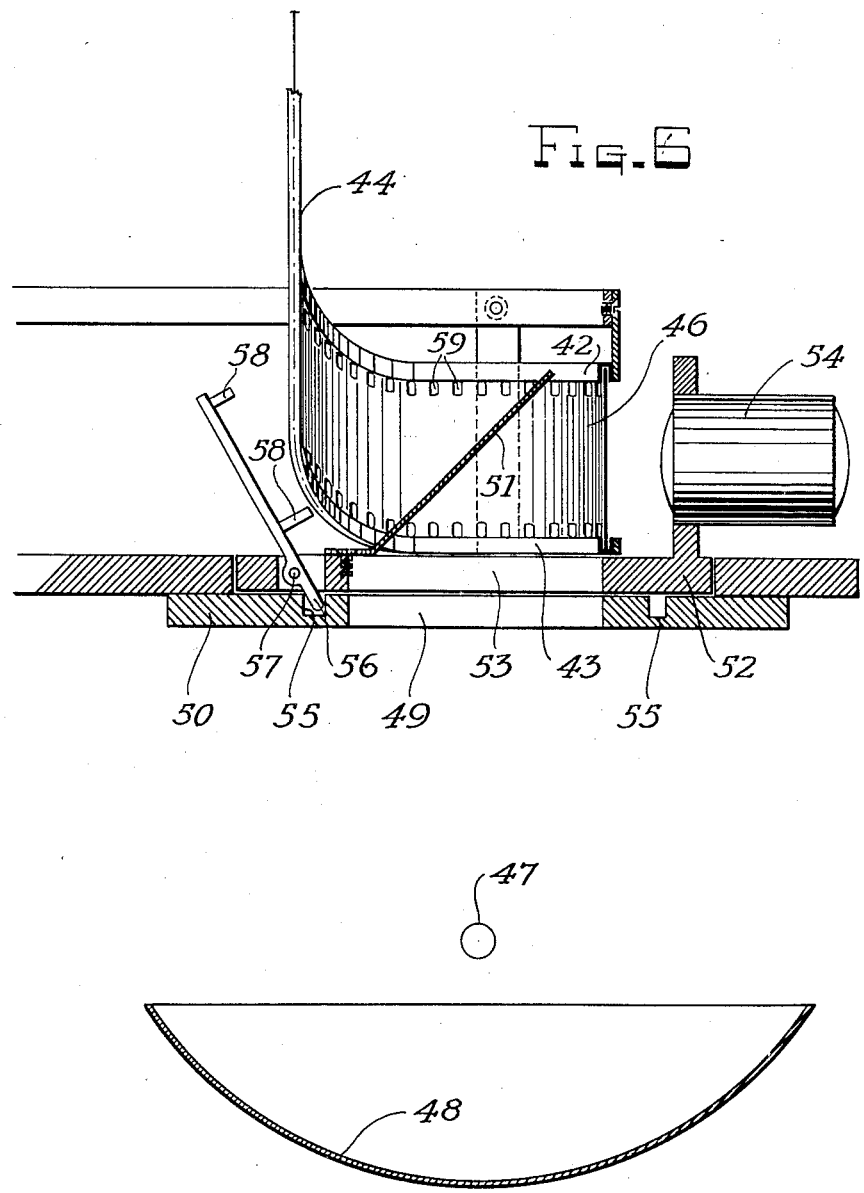

Patented Mar. 23, 1948

2,438,137

UNITED STATES PATENT OFFICE 2,438,137

APPARATUS FOR PROJECTING MOTION PICTURES

Fred Waller, Huntington, N. Y., and Willis Robert Dresser, Long Hill, Conn., assignors to The Vitarama Corporation, Huntington Station, N. Y., a corporation of New York Application December 21, 1943, Serial No. 515,112

7 Claims. (Cl. 88—18)

This invention relates to apparatus for projecting motion pictures, in which a beam of light is caused to move progressively across the screen so as to project an image in successive increments across the screen, and in which the film is advanced intermittently, with the advancing movement taking place during the interval of darkness between successive progressions of the beam of light across the screen. It is a further object of the invention to so coordinate the movement of the beam of light with the intermittent advancing movement of the film, as to produce a flickerless image on the screen.

The invention is particularly applicable to panoramic or wide angle projection in which it is desired to project an image onto a concave curved screen, as for example a cylindrical or spherical screen, and in which it is desired to project an image over a wide arc of said screen, say 100° or more in the horizontal plane, and over any desired arc in the vertical plane.

Other objects and advantages of the invention will appear hereinafter.

A preferred embodiment of the invention selected for purposes of illustration is shown in the accompanying drawings, in which, Figure 1 is a top plan view of the apparatus showing its relation to a curved screen.

Figure 2 is an enlarged top plan view.

Figure 3 is a section on the line 3—3 of Figure 2.

Figure 4 is a top plan view of a modified form of apparatus.

Figure 6 is a section on the line 6—6 of Figure 5.

Figure 5:
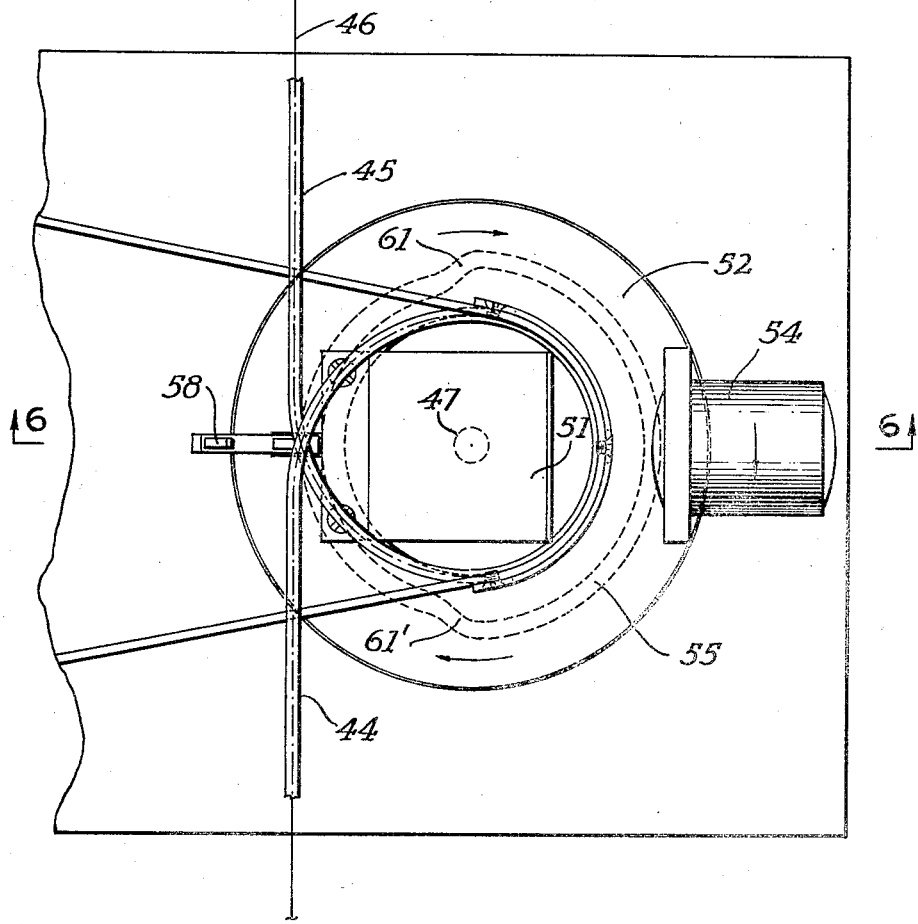
Figure 5 is an enlarged top plan view.

According to the present invention the film to be projected is fed intermittently through a gate or suitable guide means, being advanced one frame length during each intermittent motion, with the film held stationary in the gate during intervals between successive movements. The gate is provided with an aperture, of course, to permit light to pass through the film which is held in the gate, and a suitable optical lens system is provided to focus and direct the light in order to project the image onto the screen.

The optical lens system is moved to pass between the gate aperture and the screen so as to pick up the light passing through the film which is held in the gate to project the image onto the screen. As the optical lens system is so moved, it first begins to pick up the light passing through the film at one end of the gate so as to project that part of the image on the screen, and then as it continues to move along, it picks up the light passing through successive increments of the film held in the gate, so as to project successive increments of the image onto the screen, until finally the optical lens system is moved past the other end of the gate, at which time the last increment of the image is removed from the screen. During such movement, it will be observed, the complete image is spread across the screen in successive increments, and by repeatedly moving the optical lens system between the gate aperture and the screen, a succession of such complete images may be projected, one after another. In order to provide a flickerless image, the optical lens system should be moved at a rate such as to make forty-eight or more passages between the gate and the screen per second. Alternatively, a plurality of similar optical lens systems may be employed and moved as above described, in which case, the total number of passages of the plurality of optical lens systems should be forty-eight or more per second.

In every case, there is an interval of darkness between the termination of the projection of one image and the beginning of the projection of the next successive image. The intermittent feed motion of the film is timed to take place during this interval of darkness, but it is to be understood that it is not required to advance the film during each such interval of darkness. On the contrary, it is possible to project a plurality of successive images between each successive advancing movement of the film, provided always that such advancing movement takes place during an interval of darkness between the projection of successive images. In this connection it may be noted that the ratio of the interval of projection to the interval of darkness is not significant to the attainment of a flickerless image, provided the interval between the beginning of projection of one image and the beginning of projection of the next successive image is one forty-eighth of a second or less.

Referring now to Figures 1, 2 and 3, the invention is illustrated as applied to panoramic or wide angle projection in which it is desired to project an image onto a curved screen, as for example, the cylindrical screen 11 of Figure 1 where it may be desired to project an image over an arc of say 150° or more of the screen. For this purpose, instead of the conventional flat gate as used in conventional projectors, a curved cylindrical gate is provided having the upper and lower guide channels 12 and 13 between which the film is moved, said gate having a large curved aperture extending substantially from one end of said channels to the other.

The film 14 may be fed intermittently through said curved gate in any desired manner, as by the conventional intermittent feed sprocket 15. A conventional guide roller 16 may be used to guide the film into the gate and the usual feed roll 17 and take-up roll 18 may be provided. It will be understood, however, that in such panoramic projection, the length of each film frame will be longer than customary, being substantially coextensive in length with the length of the gate aperture. Consequently, the motion of the feed sprocket must be adapted to feed the extra length of film during each intermittent motion thereof.

In the embodiment illustrated, a light source 21 is located below the film and a concave reflector 22 is provided to direct light from the source vertically upwardly through the aperture 23 in the fixed bed plate 24. The light from the light source and reflector is received on a mirror 25 arranged at an angle of 45° to the vertical and is reflected by this mirror against a curved mirror 26 also arranged at an angle of 45° which condenses the light and reflects a narrowed beam of light vertically upward against a fixed conical mirror 27, the conical surface being also arranged at an angle of 45° to the vertical. The axis of the conical mirror is concentric with the center of curvature of the gate, and the conical mirror is co-extensive with the gate.

The mirrors 25 and 26 are mounted on a ring 28 having a central aperture 29 in line with the aperture 23, the mirror 25 being mounted to intercept the light passing through the apertures and the mirror 26 being mounted directly below the conical mirror 27. The ring 28 is mounted for rotation on the bed plate 24 and may be driven at constant speed in any suitable manner. A lens holder 30 containing a suitable optical lens system is also provided and is caused to rotate with the ring 28 and mirrors 25 and 26. For example, the lens holder may be mounted on a spindle 31 supported on the back of the mirror 25.

In the embodiment illustrated, as shown in Figure 1, the optical lens system is assumed to be of a nature such as to project a beam covering approximately 30° of arc of the screen 11. As the ring 28 is rotated in clockwise direction, for example, due to the arrangement of mirrors 25, 26 and 27 the section of the film which is held in the gate will be exposed progressively from the right hand end of the gate aperture, nearest the intermittent feed sprocket, to the left hand end, nearest the guide roller. Furthermore, since the lens holder 30 rotates with the ring, the beam of light directed toward the screen and covering approximately 30° of arc of the screen will be moved progressively across the screen in clockwise direction to project an image in successive increments.

The rotation of the ring 28 is synchronized with intermittent feed motion of the film in such manner that, as previously explained, the advancing motion of the film takes place during an interval of darkness. Thus, in the embodiment illustrated the advancing movement of the film takes place during the interval between the time when the last increment of the image disappears from the right hand end of the screen and the time when the first increment of the next successive image appears on the left hand end of the screen. The rate of rotation of the ring, to produce a flickerless image, should be 48 R. P. S. or more, although it will be understood that a plurality of lens holders and mirrors similar to the lens holder 30 and mirrors 25 and 26 may be mounted at equally spaced intervals around the ring, in which case a reduction in the number of revolutions per second is permissible.

In the embodiment illustrated, with a single lens holder, the film may be advanced once for each revolution of the ring, or the ring may be permitted to make a plurality of revolutions between successive advancing movements of the film. For example, if it is desired that the film be advanced at the rate of 16 frames per second, the ring might be rotated three times between successive advancing movements of the film to provide the desired rate for a flickerless image. Or if it is desired that the film be advanced at the rate of 24 frames per second the ring might be rotated twice between successive advancing movements of the film.

Referring now to Figures 4, 5, and 6, the invention is again illustrated as applied to panoramic or wide angle projection onto a curved screen as for example, the cylindrical screen 41 which may be similar to the screen 11 of Figure 1. In this embodiment of the invention a curved gate is again provided, but the convex side of the gate is opposed to the screen instead of the concave side as in Figures 1, 2 and 3. The curved gate consists of upper and lower guide channels 42 and 43 between which the film is moved, and at the ends of the gate proper, the said guide channels extend backwardly and upwardly as shown at 44 and 45 in Figures 5 and 6 in order to guide the film in paths which will not interfere with the movement of the rotating lens holder as hereinafter described.

The film 46 may be fed intermittently through said curved gate in any desired manner, as by a conventional intermittent feed sprocket, or may be fed intermittently in the manner hereinafter described.

A light source 47 is located below the film and a concave reflector 48 is provided to direct light vertically upward through the aperture 49 in the fixed bed plate 50. The light from the light source and reflector is received on a mirror 51 arranged at an angle of 45° to the vertical. The said mirror is mounted on a ring 52 having a central aperture 53 in line with the aperture 49, the mirror 51 being mounted to intercept the light passing through the apertures and adapted to reflect the light toward a lens holder 54 containing a suitable optical lens system. In the present case, where the convex side of the gate is opposed to the screen, the optical lens system should include means for erecting what would otherwise be an inverted image. The lens holder, as shown, is also mounted on the ring 52 so as to rotate with the ring and mirror 51.

The bed plate 50 is provided with a cam track 55 adapted to receive the lower end 56 of a lever pivoted at 57 to the ring 52, the said lever being provided with claws 58 spaced to engage the usual sprocket holes 59 of the film. The said cam track 55 consists of two portions of different radius with connecting portions 61, 61' located approximately opposite the two ends of the curved gate. As a result, assuming rotation of the ring 52 in clockwise direction, when the lower end 56 of the lever reaches the portion 61 of the cam track, the upper end of the lever swings inwardly causing the claws 58 to engage the sprocket holes 59 so that continued rotation of the ring 52 will cause the film to be fed forwardly. When the ring has advanced a distance sufficient to bring the lower end 56 of the lever into the portion 61' of the cam track, the claws swing outwardly away from the film and the feed motion ceases. By properly adjusting the positions of the portions 61, 61' of the cam track, the length of feed may be adjusted as desired in accordance with the length of the gate aperture.

As in the embodiment previously described, the optical lens system is assumed to be of a nature such as to project a beam covering approximately 30° of arc of the screen 41. Thus, as the ring 52 is rotated in clockwise direction, the beam will be rotated and the section of the film which is held in the gate will be exposed progressively from the end nearest the cam track section 61 to the other end nearest the cam track section 61'. The beam of light directed toward the screen will move progressively across the screen in clockwise direction to project an image in successive increments across the screen. It will be observed, moreover, that since the lens holder and claws 58 are located on opposite sides of the ring 52, the intermittent motion of the film takes place only when the beam of light is directed away from the gate aperture, i. e. during the interval of darkness so that the advancing movement of the film is automatically synchronized with the rotation of the ring. For a flickerless image, the ring should be rotated at the rate of 48 R. P. S. or more as previously explained.

It will be understood that the invention may be variously modified and embodied within the scope of the subjoined claims.

We claim as our invention:

1. Motion picture projecting apparatus comprising in combination, a curved concave screen, a curved cylindrical gate having an aperture therein extending through an arc of less than 360°, means for holding a frame of a motion picture film stationary in said curved gate, means for scanning said stationary frame with a rotating beam of light passing through a rotating lens to project an image in successive increments progressively across said screen, said scanning means including means for rotating said beam of light and said lens about a common center through an arc of 360°, and means for feeding said film when said rotating beam is directed away from said gate aperture, said gate aperture being disposed on the side of said center opposite said screen, and said beam of light being directed through said film and lens from a device which rotates about said center.

2. Motion picture projecting apparatus comprising in combination, a curved concave screen, a curved cylindrical gate having an aperture therein extending through an arc of less than 360°, means for holding a frame of a motion picture film in said curved gate, means for scanning said frame with a rotating beam of light passing through a rotating lens to project an image in successive increments progressively across said screen, said scanning means including means for rotating said beam of light and said lens about a common center through an arc of 360°, and means for feeding said film when said rotating beam is directed away from said gate aperture, said gate aperture being disposed on the side of said center opposite said screen, and said beam of light being directed from a source on the axis of said center to a mirror rotating on said center at one side of said lens, thence to a rotating mirror located off said center, thence to a fixed curved inclined mirror concentric with said center, and from said curved mirror through said gate aperture, said fixed curved inclined mirror being of an arcuate length corresponding to the arc of the gate aperture.

3. Motion picture projecting apparatus comprising in combination, a curved concave screen, means for holding a frame of a motion picture film in an arcuate gate, means for scanning said frame with a rotating beam of light passing through a rotating lens to project an image in successive increments progressively across said screen, means for rotating said beam of light and said lens about a common center, and means for feeding said film when said rotating beam is directed away from said gate, said gate being disposed on the side of said center toward said screen, said lens rotating around said gate, and said beam of light being directed through said film and lens from a device which rotates on said center.

4. Motion picture projecting apparatus comprising in combination, a curved concave screen, means for holding a frame of a motion picture film in an arcuate gate, means for scanning said frame with a rotating beam of light passing through a rotating lens to project an image in successive increments progressively across said screen, means for rotating said beam of light and said lens about a common center, and means for feeding said film when said rotating beam is directed away from said gate, said gate being disposed on the side of said center toward said screen, said lens rotating around said gate, said beam of light being directed through said film and lens from a device which rotates on said center, and the film being directed to and from said gate in an axial direction to clear the lens rotating around the gate.

5. Motion picture projecting apparatus comprising in combination, a film gate fixed on an arc about a projection center, a carrier rotating about said center and carrying a lens and a mirror, said carrier being formed with a center opening for passing a beam of light axially to said mirror, means for directing a beam of light axially to said mirror, the light beam passing through the film gate after leaving said mirror during part of its rotation, said mirror being located at and rotating on said center, and said lens being located off and rotating about said center.

6. Motion picture projecting apparatus comprising, in combination, a curved cylindrical gate having an aperture therein extending through an arc of less than 360°, a carrier mounted for rotation about the center of said gate, said carrier having a center opening for passing a beam of light axially therethrough, means for rotating said carrier continuously through an arc of 360°, means including a mirror mounted on said carrier and rotating therewith for intercepting said axial beam and directing said beam through said gate aperture during a portion of each rotation of said carrier, and means for intermittently advancing a film through said gate during that portion of each rotation of said carrier when said beam is directed away from said gate aperture.

7. Motion picture projecting apparatus comprising in combination, a film gate fixed on an arc about a projection center, a carrier rotating about said center and carrying a lens and a mirror, said carrier being formed with a center opening for passing a beam of light axially to said mirror, means for directing a beam of light axially to said mirror, the beam passing through the film gate after leaving said mirror during part of its rotation, means for directing film to and from said gate, and means mounted on said carrier for intermittently feeding said film when the light beam is directed away from the gate.

FRED WALLER.
WILLIS ROBERT DRESSER.

REFERENCES CITED

The following references are of record in the file of this patent:

UNITED STATES PATENTS

| Number | Name | Date |
|---|---|---|
| 1,492,503 | Belin | Apr. 29, 1924 |
| 1,196,066 | Alberini | Aug. 29, 1916 |
| 1,842,759 | Malm | Jan. 26, 1932 |
| 705,771 | Lumiere | July 29, 1902 |

FOREIGN PATENTS

| Number | Country | Date |
|---|---|---|
| 129,646 | Germany | Apr. 16, 1902 |
| 458,588 | France | Aug. 11, 1913 |